United States Patent [19]
Griffith

[11] Patent Number: 5,784,598
[45] Date of Patent: *Jul. 21, 1998

[54] METHOD AND APPARATUS FOR CHANGING PROCESSOR CLOCK RATE

[75] Inventor: Jenni L. Griffith, Belton, Tex.

[73] Assignee: Texas Instruments Incorporated, Dallas, Tex.

[*] Notice: This patent issued on a continued prosecution application filed under 37 CFR 1.53(d), and is subject to the twenty year patent term provisions of 35 U.S.C. 154(a)(2).

[21] Appl. No.: 479,580

[22] Filed: Jun. 7, 1995

Related U.S. Application Data

[63] Continuation of Ser. No. 897,693, Jun. 12, 1992, abandoned.

[51] Int. Cl.$^6$ .................................................... G06F 1/08
[52] U.S. Cl. ........................................ 395/556; 395/560
[58] Field of Search ................................ 395/550, 750, 395/555, 556, 559, 560, 750.04

[56] References Cited

U.S. PATENT DOCUMENTS

| | | | |
|---|---|---|---|
| 3,764,992 | 10/1973 | Milne | 364/DIG. 1 |
| 4,851,987 | 7/1989 | Day | 395/550 |
| 5,021,950 | 6/1991 | Nishikawa | 364/200 |
| 5,167,024 | 11/1992 | Smith et al. | 395/375 |
| 5,203,003 | 4/1993 | Donner | 395/800 |
| 5,218,704 | 6/1993 | Watts, Jr. et al. | 395/750 |
| 5,247,655 | 9/1993 | Khan et al. | 395/550 |
| 5,291,542 | 3/1994 | Kivari et al. | 379/58 |
| 5,390,350 | 2/1995 | Chung et al. | 395/150 |

FOREIGN PATENT DOCUMENTS

| | | | |
|---|---|---|---|
| 0 451 661 A2 | 10/1991 | European Pat. Off. | G06F 1/32 |
| WO 92/09028 | 5/1992 | WIPO | G06F 1/32 |

OTHER PUBLICATIONS

Intel 486 DX2 Microprocessor Data Book, pp. 1-4, 1-6, 1-7, 2-1, 6-1, 6-2, 6-5, and 14-3.
Intel Microprocessors, vol. 1, 1992, various pages, section 6.

Primary Examiner—Dennis M. Butler
Attorney, Agent, or Firm—Ronald O. Neerings; James C. Kesterson; Richard L. Donaldson

[57] ABSTRACT

A method and apparatus (10) for changing processor clock rate are provided in which control signals operate to change the rate of a clock signal output by clock switching logic (26). A processor (24) floats a system bus after the clock signal is changed. After the processor (24) has locked onto the new clock rate it is permitted to resume activity on the system bus.

50 Claims, 13 Drawing Sheets

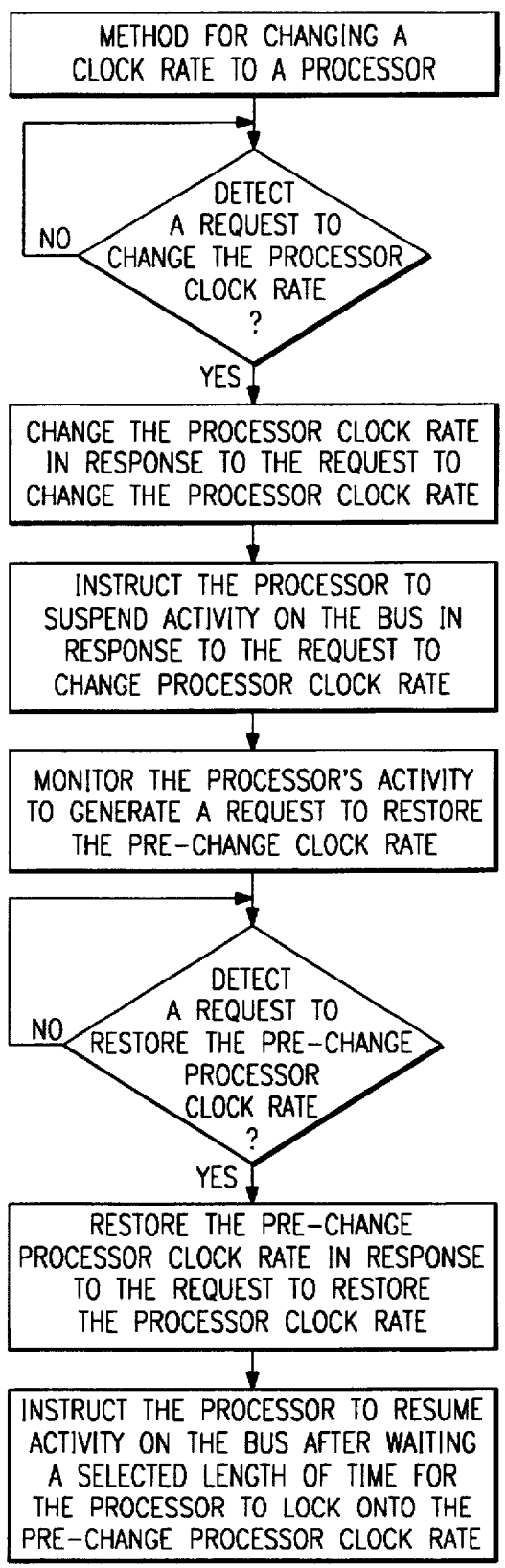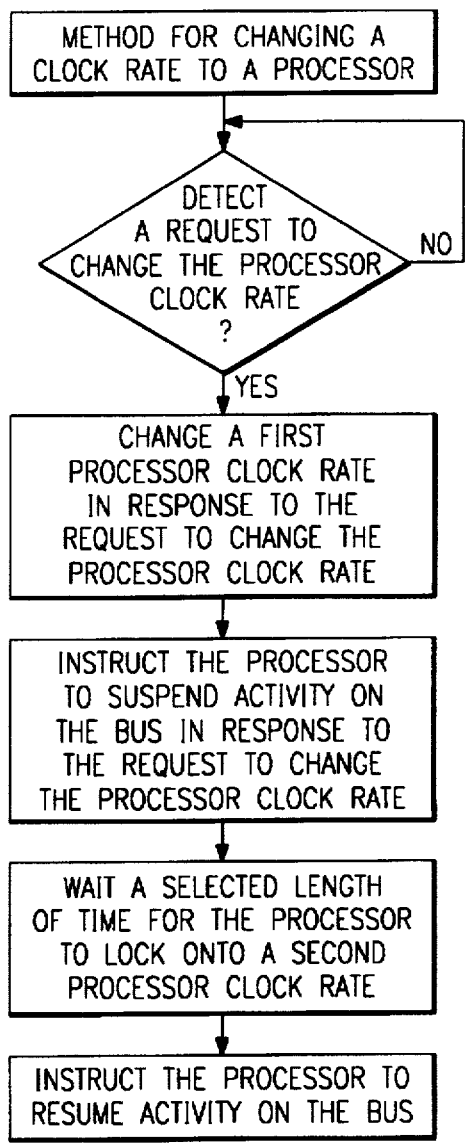

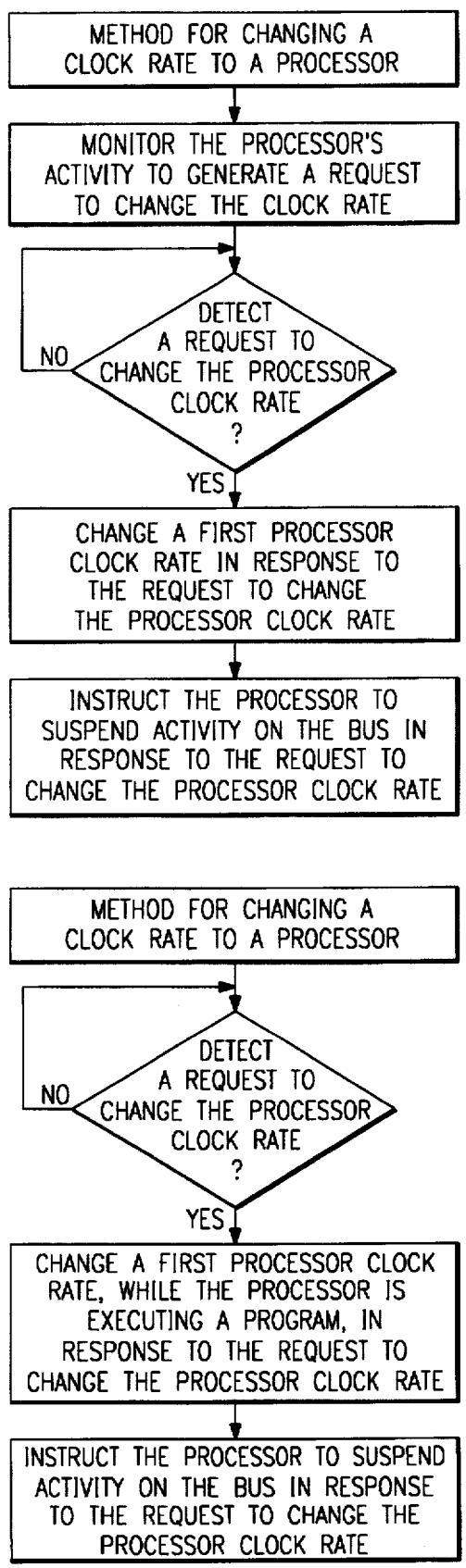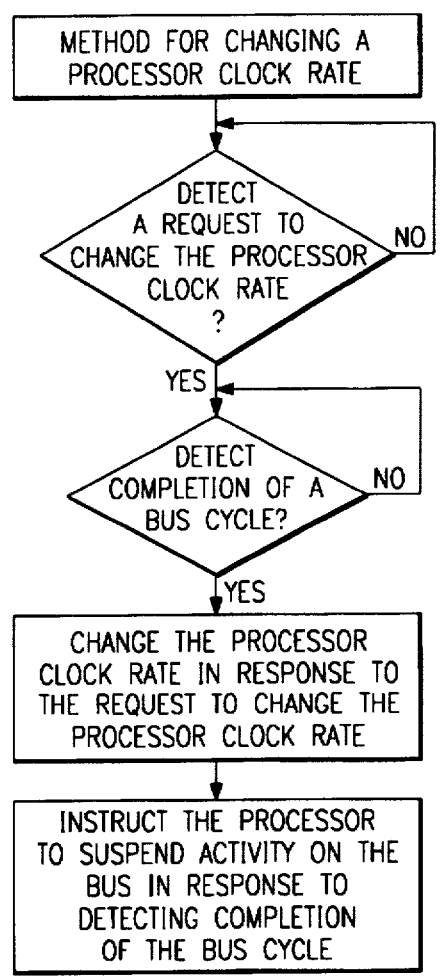
FIG. 10
FIG. 11
FIG. 12

5,784,598

METHOD AND APPARATUS FOR CHANGING PROCESSOR CLOCK RATE

This application is a Continuation of application Ser. No. 07/897,693 filed Jun. 12, 1992, now abandoned.

RELATED APPLICATIONS

This application relates to United States Patent application Ser. No. 07/429,270, now U.S. Pat. No. 5,218,704 filed Oct. 30, 1989, and entitled Real-Time Power Conservation for Portable Computers.

TECHNICAL FIELD OF THE INVENTION

This invention relates generally to the field of electronic methods and circuits, and more particularly to a method and apparatus for changing a processor's clock rate.

BACKGROUND OF THE INVENTION

Portable personal computers which run on battery power have become extremely popular because of their small size, power, and transportability. However, the length of time that portable computers can operate is limited due to battery power limitations. Attempts have been made to increase battery life by choosing expensive, low power components for use in these portable computers. This approach, however, because of the added cost, and because battery life is not significantly increased, is not attractive.

Another attempt at power reduction for portable computers involves slowing or stopping a disk drive after a preset period of inactivity. This approach is unattractive, however, since the user must wait for the disk to come back up to speed when its use is required. Another problem associated with this technique exists with application software packages which may require disk access during a period that the disk has been slowed or stopped.

Similarly, some designers conserve power by providing circuitry for automatically turning the computer display or the entire computer off after a predetermined period of inactivity. This type of power conservation allows the portable computer to shut down in a situation, for example, where the operator forgets to turn off the computer. Although this approach allows for power conservation in certain situations, it does not allow for real time power conservation, such that the computer may be restored to full operation without the kinds of delays associated with computer resets.

Still another kind of power conservation has been attempted in which, rather than turning off a computer after a preset period of non-use, the clock to the microprocessor is either turned off or slowed down. This approach has the advantage of allowing for quick restart of the processor, since no system reset has occurred and no reboot will be required, as is the case when the computer is turned off. This approach, however, also has the drawback of not providing for real time intelligent power conservation during idle periods of operation.

Furthermore, many peripherals, such as Local Area Networks ("LANs"), and software routines, such as those having timing loops, require that the clock rates of processors with which they communicate be within specific ranges. Because of this requirement, processors running at set clock rates outside of the necessary ranges are unable to operate with such peripherals or software.

Therefore, a need has arisen for a method and device for changing processor clock rates for real time power conservation and compatibility with other devices.

SUMMARY OF THE INVENTION

In accordance with the present invention, a method and apparatus for changing a processor clock rate are provided which substantially eliminate and reduce disadvantages and problems associated with prior art power conservation systems and systems for changing processor clock rates. In particular, a method and apparatus are provided for detecting a request to change a processor clock rate. In response to that request, the processor clock rate is changed, and the processor is instructed to float the bus. The processor then either locks onto the new clock rate and resumes control of the bus, or, if the request is to stop the processor clock rate, the processor does not regain control of the bus.

The processor clock rate may be restored by the method and apparatus of the present invention by detecting a request to restore the processor clock rate and restoring the processor clock rate in response to that request. The processor is instructed to resume activity on the bus after the processor locks onto the restored processor clock rate.

An important technical advantage of the present invention is the reduction of the processor clock rate, thereby providing for substantial power conservation, without causing a system reset or reboot. Because of this important technical advantage, power conservation is real time, and transparent to the user.

Another important technical advantage of the present invention is that it operates with processors that use internal frequency multipliers for internal timing.

Another important technical advantage of the present invention is its ability to reduce the processor clock rate in real time, for example during program execution, thereby providing for compatibility with computer peripherals and software that are not able to operate properly at increased processor clock rates without causing system reset or reboot. Because of this advantage, processor speed switching is real time, and is transparent to the user.

BRIEF DESCRIPTION OF THE DRAWINGS

For a more complete understanding of the present invention and the advantages thereof, reference is now made to the following description taken in conjunction with the accompanying drawings:

FIGS. 2–21 are diagrammatic representations of methods of practicing the invention.

DETAILED DESCRIPTION OF THE INVENTION

Figure 1:
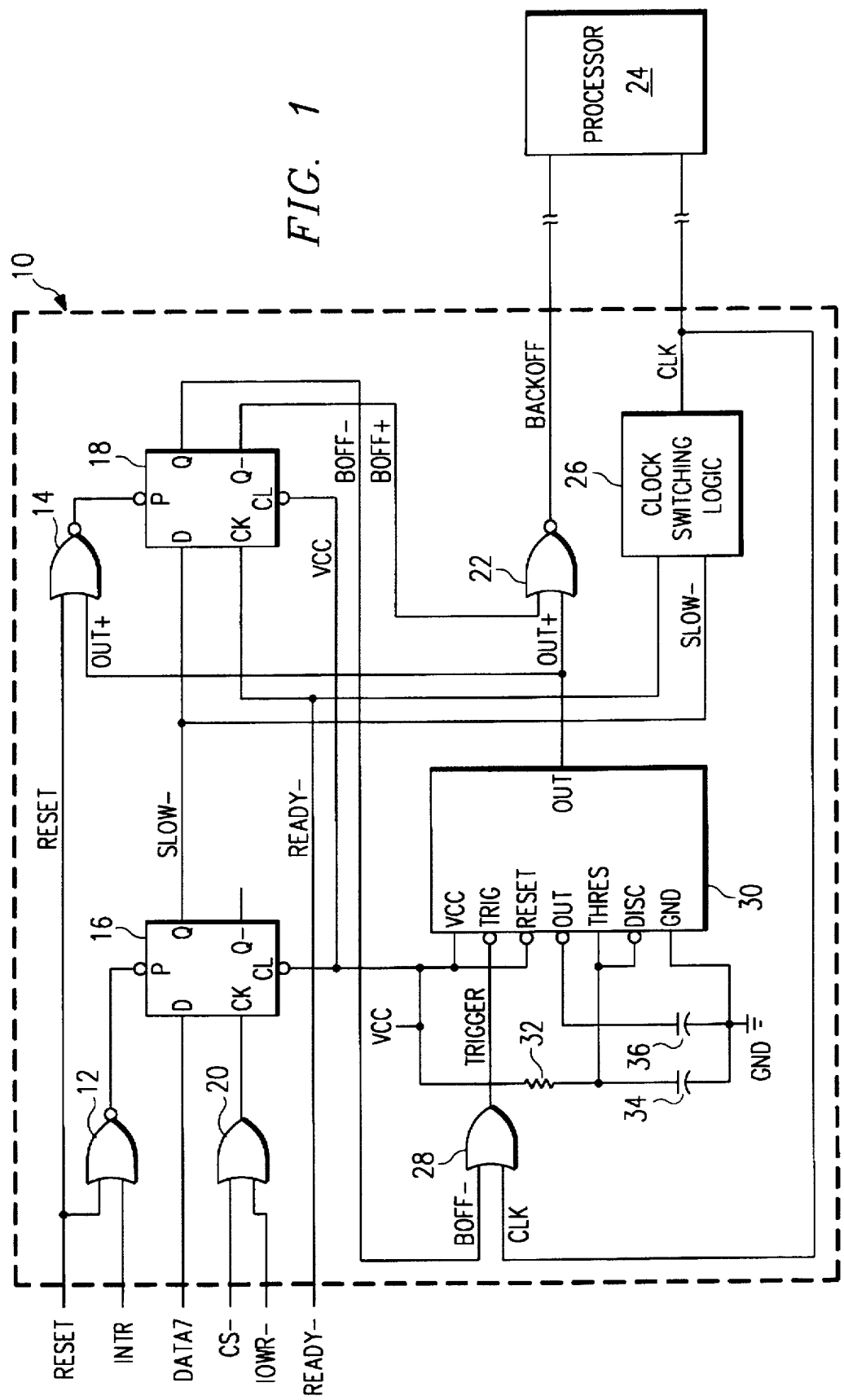
FIG. 1 illustrates a schematic diagram of a circuit constructed according to the teachings of the present invention for stopping or slowing a clock signal to a processor.
Figure 2:
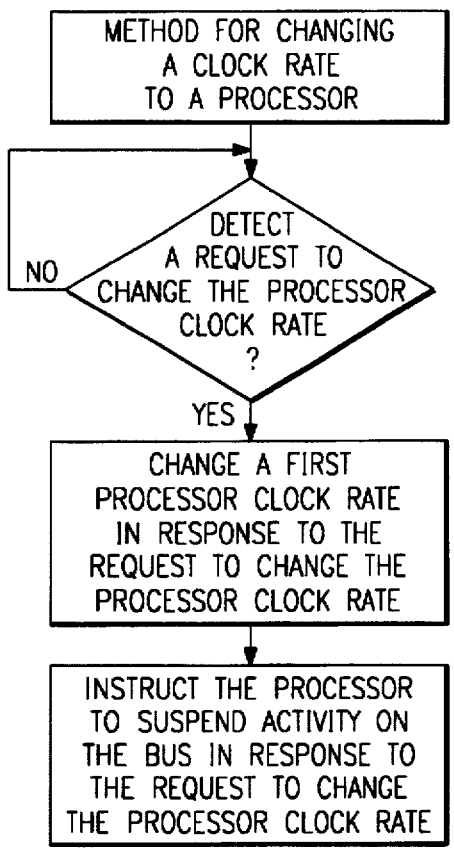
Figure 3:
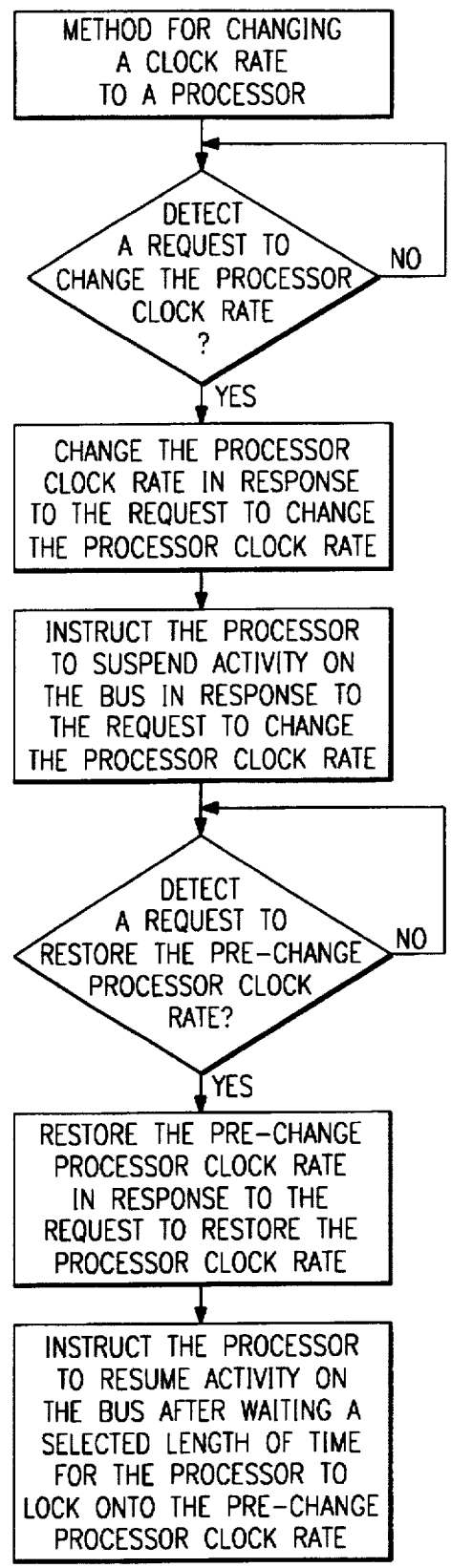
Figure 6:
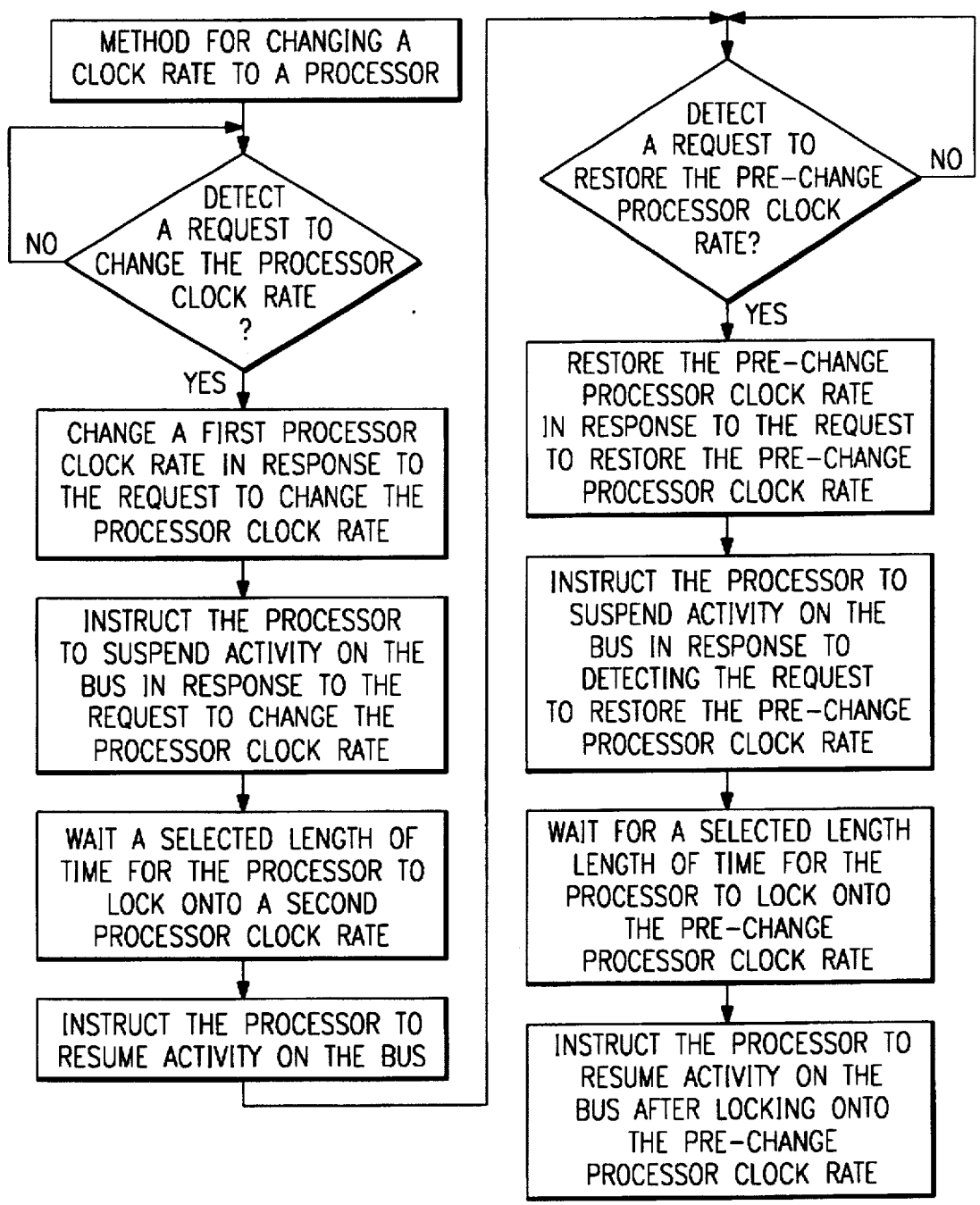
Figure 7:
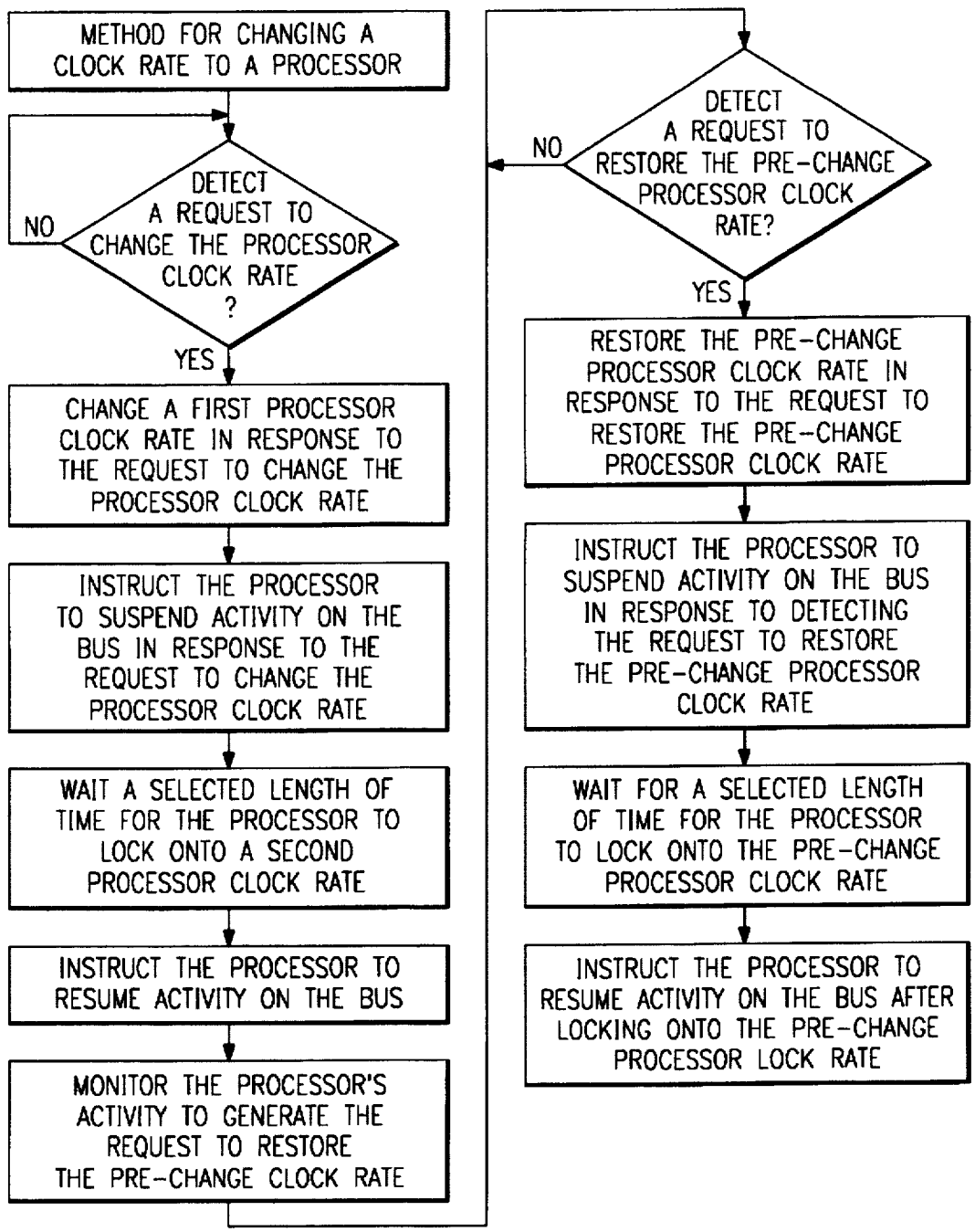
Figure 8:
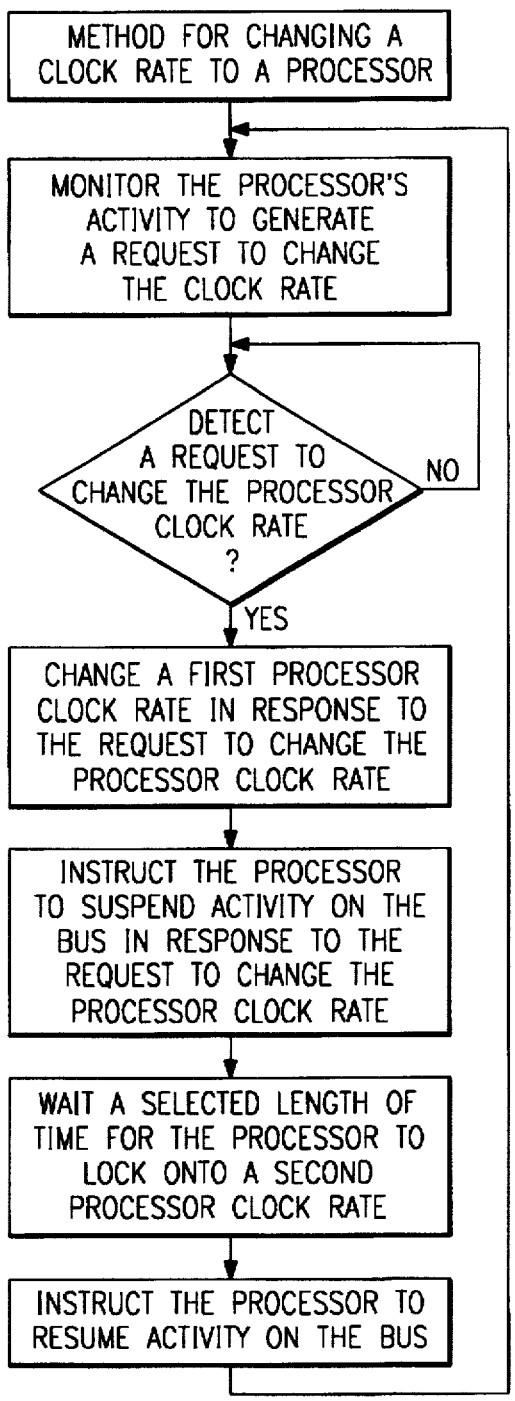
Figure 9:
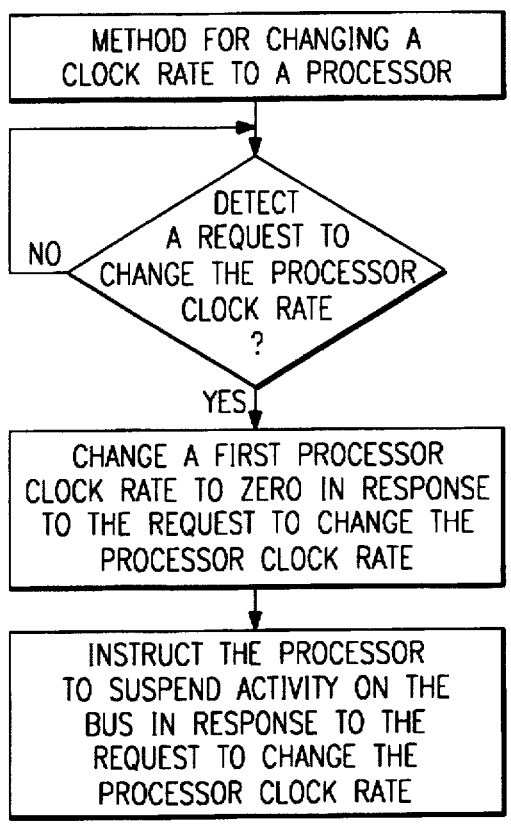
Figure 13:
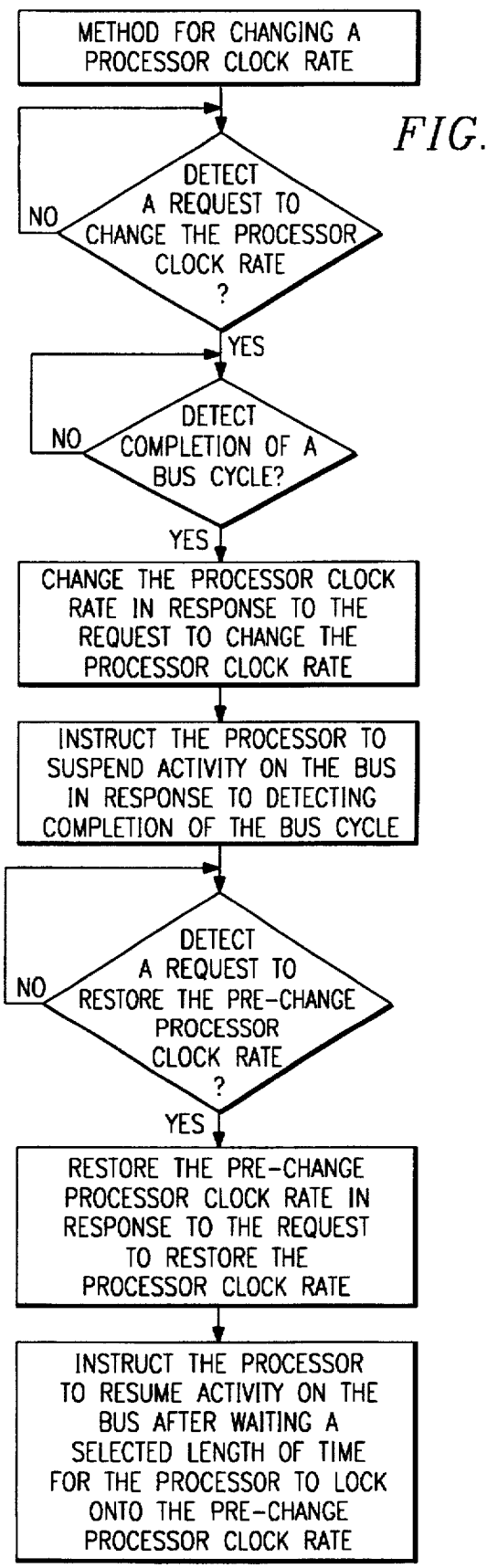
Figure 15:
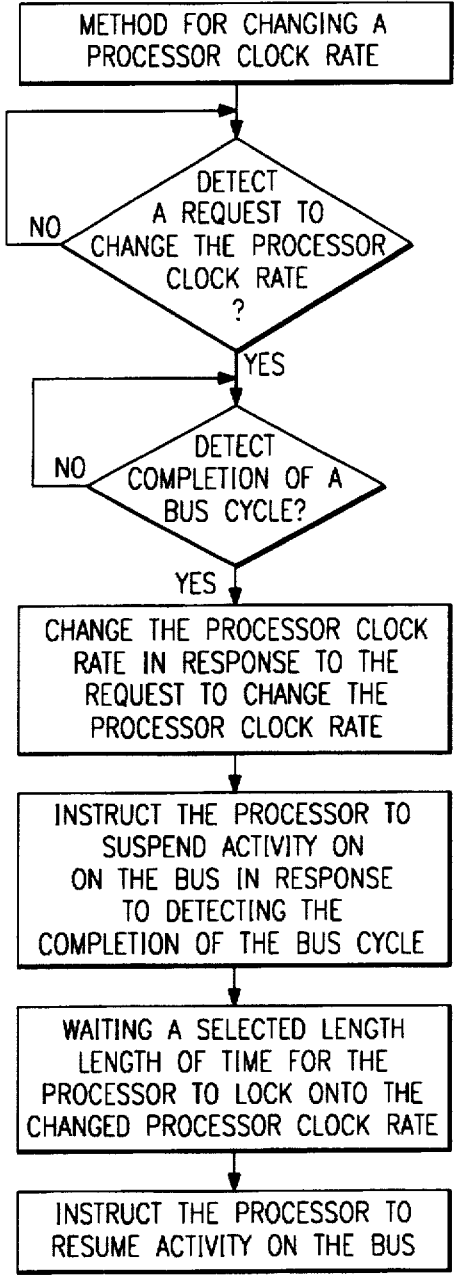
Figure 14:
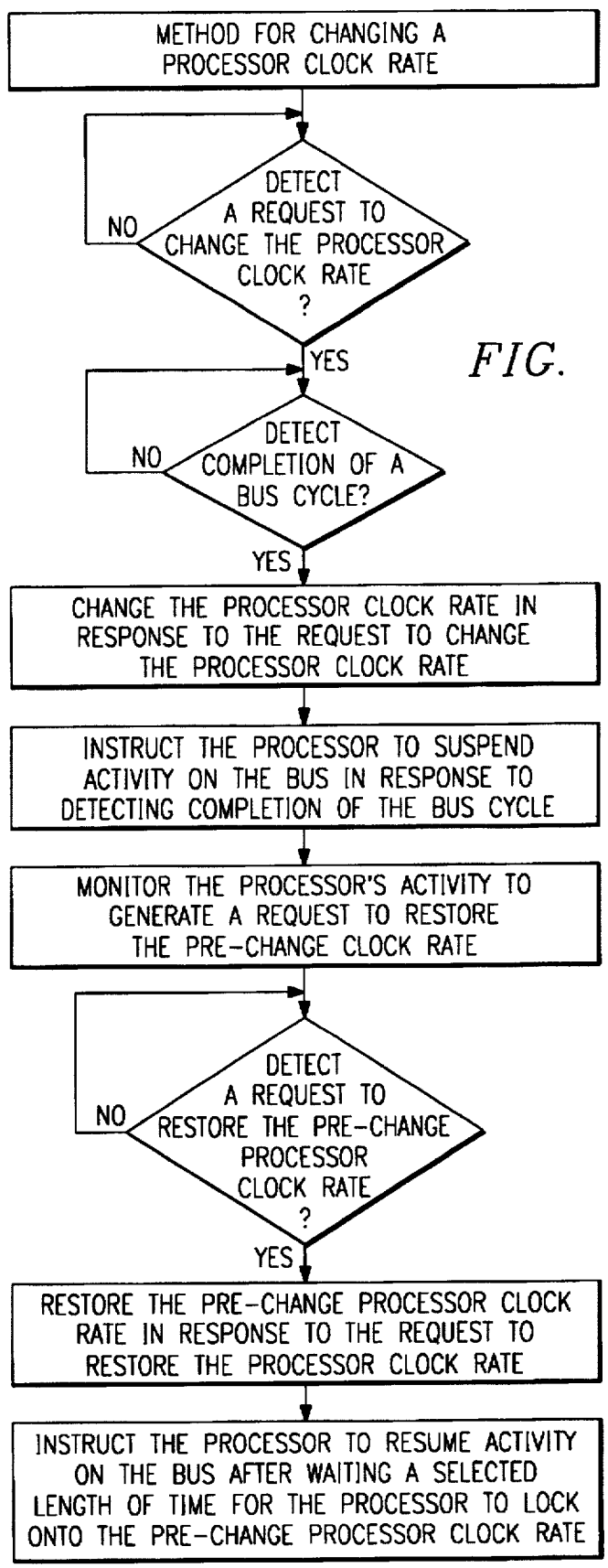
Figure 16:
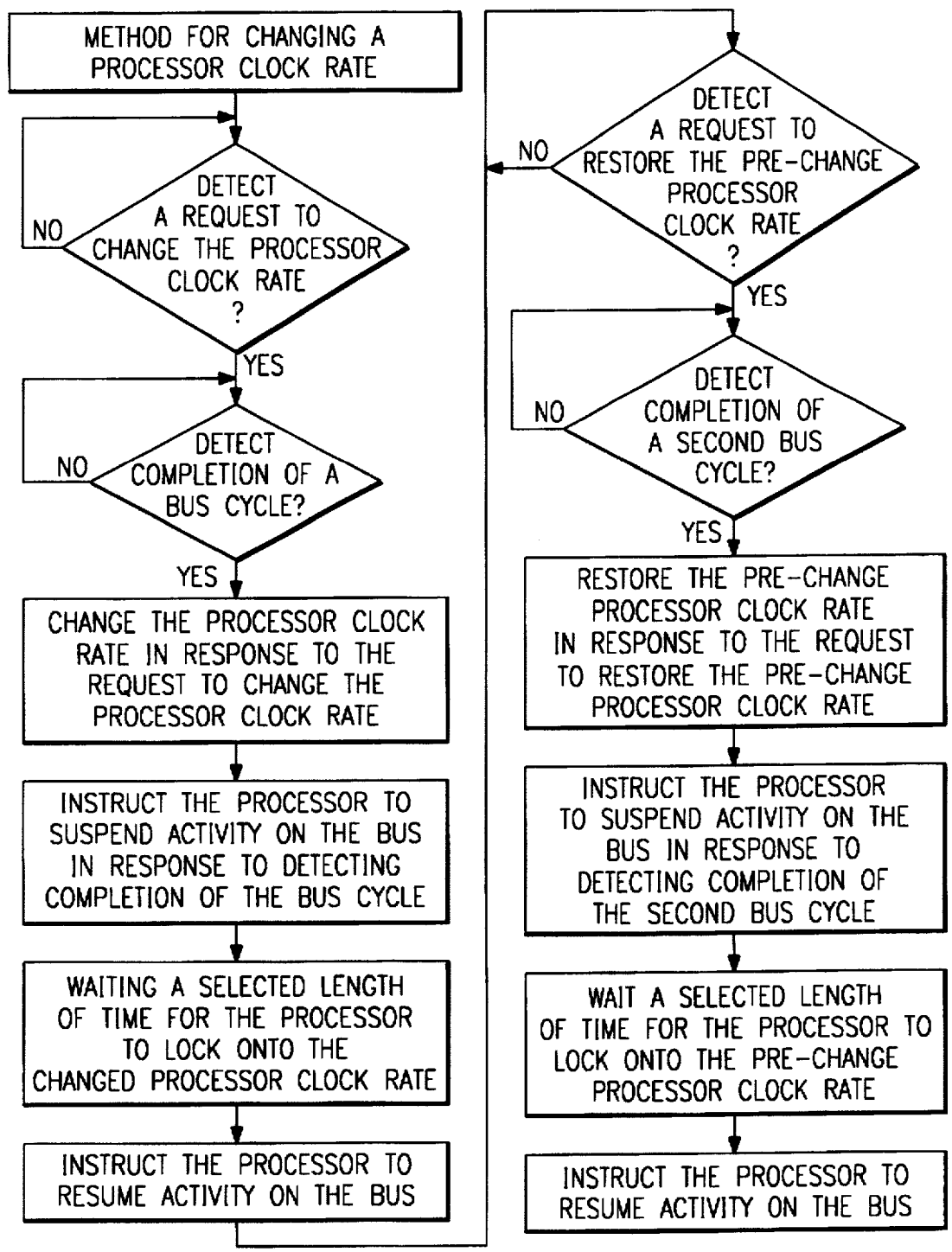
Figure 17:
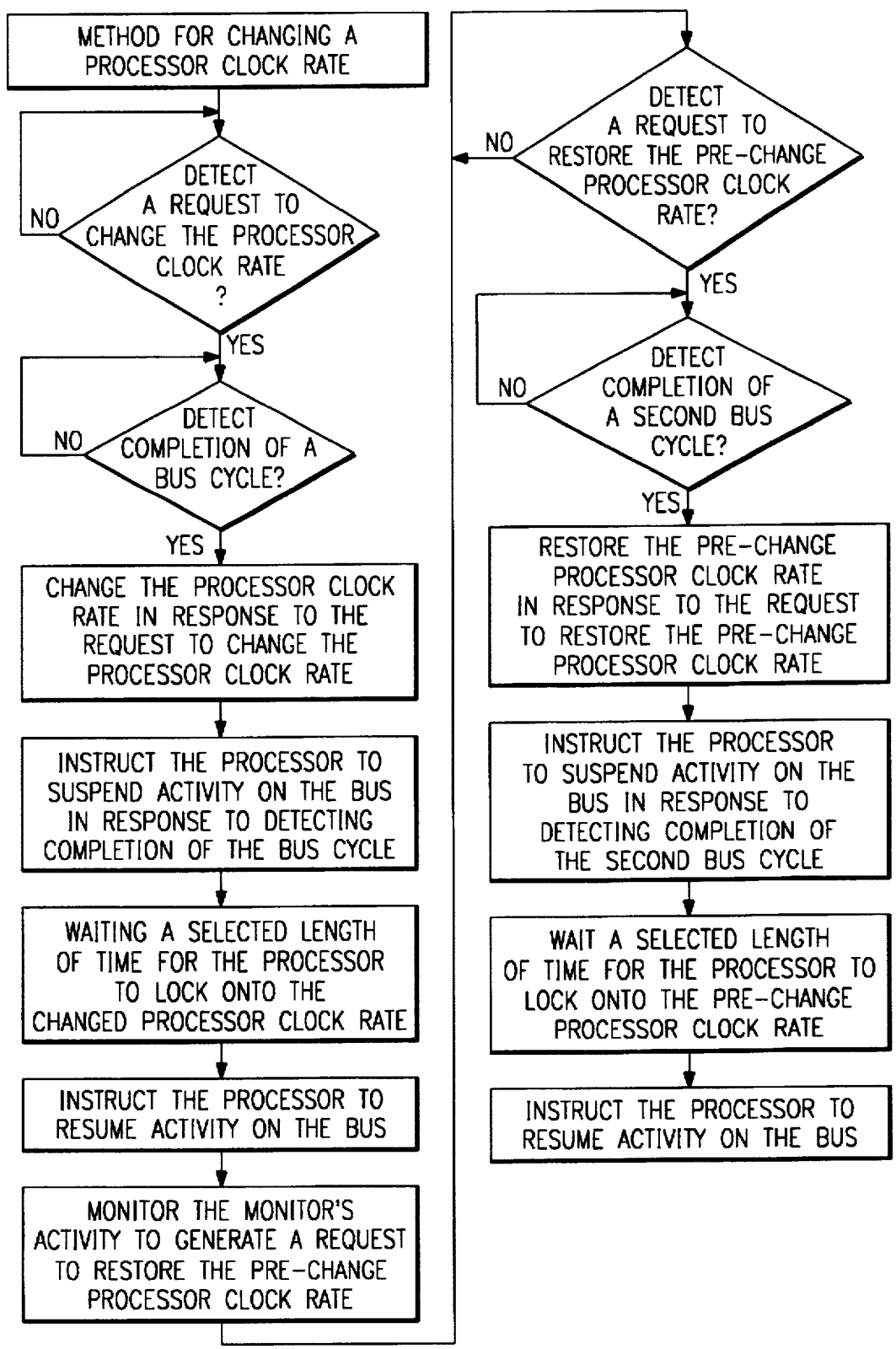
Figure 18:
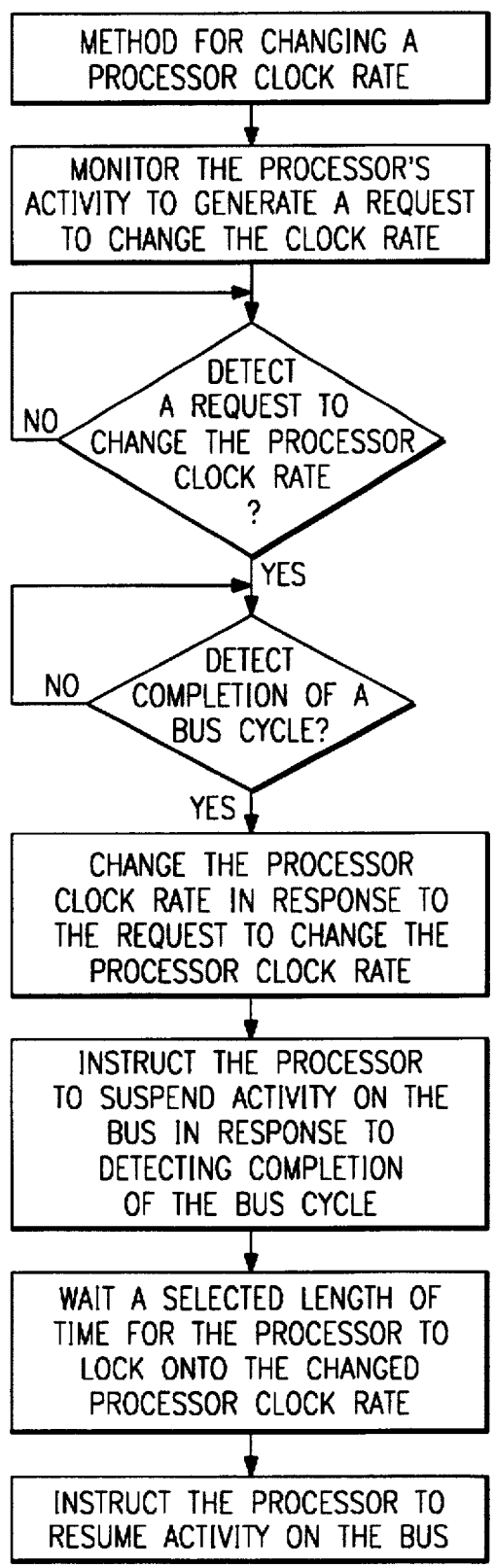
Figure 19:
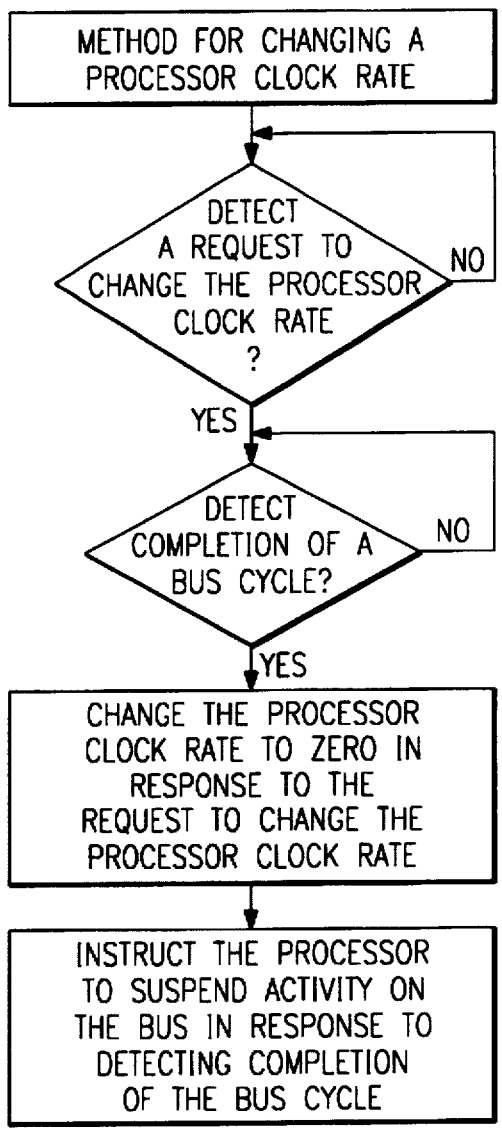
Figure 20:
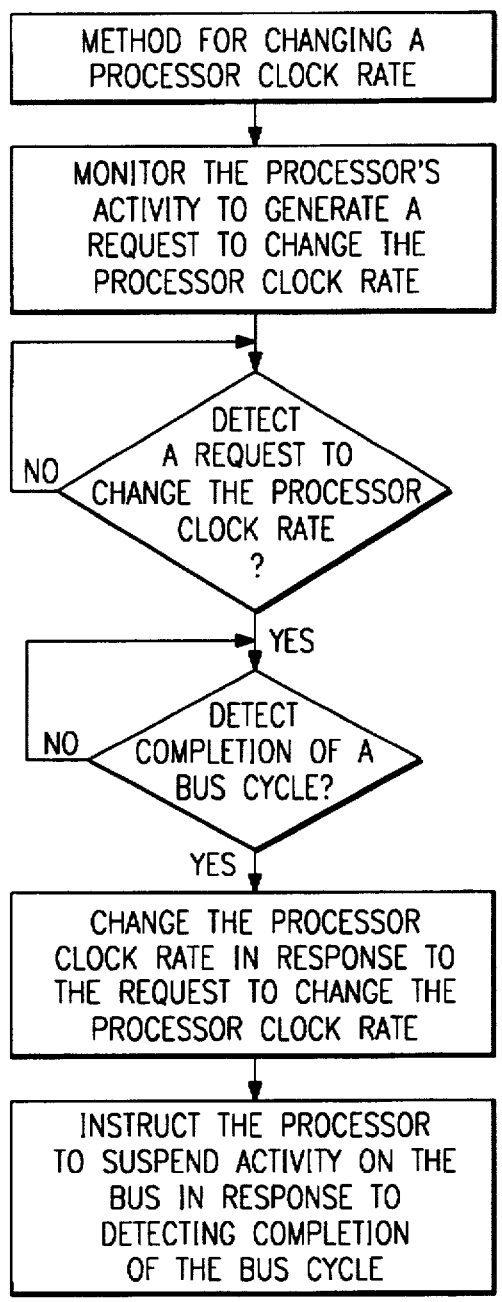
Figure 21:
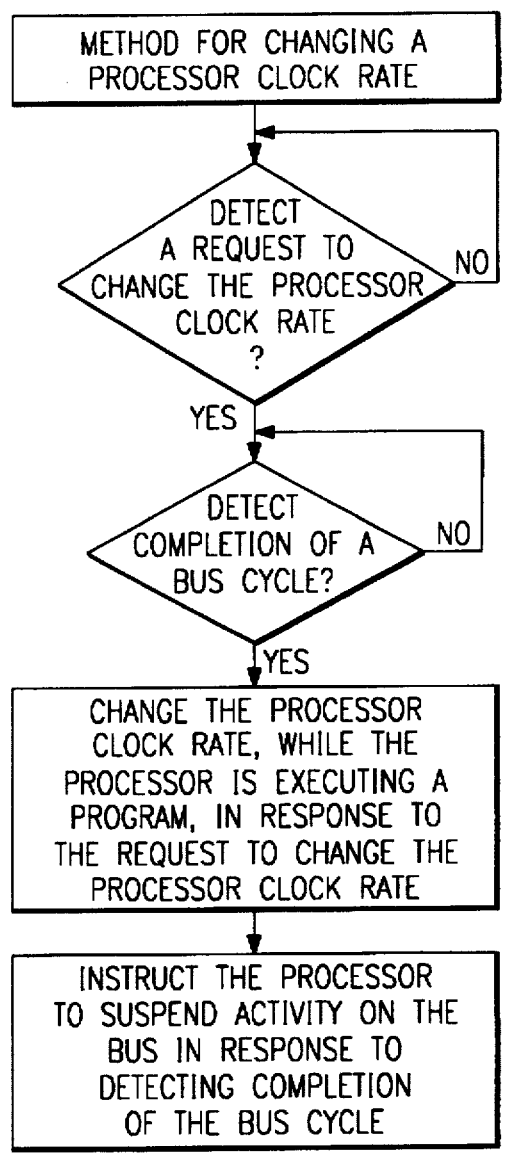

FIG. 1 is a circuit diagram of a circuit 10 for changing or stopping a processor clock rate for real time power conservation according to the present invention. Circuit 10 may be connected to a processor 24 as shown in FIG. 1.

As shown in FIG. 1, inputs RESET and INTR are input into a NOR-Gate 12. RESET and INTR may be generated by a conventional computer system in which the present invention is to be used, or may be generated by a monitoring device used to determine when the processor clock rate is to be restored. The RESET input is also coupled to an input of NOR-Gate 14. The output of NOR-Gate 12 is coupled to the preset input of a D-flip flop 16. The output of NOR-Gate 14 is coupled to the preset input of a D-flip flop 18. The D input of flip flop 16 is coupled to an input DATA7. The clock input to D-flip flop 16 is coupled to the output of an OR-Gate 20. The inputs of OR-Gate 20 are coupled to inputs CS– and IOWR–.

The Q output of D-flip flop 16 is coupled to the D input of flip flop 18. The clock input of D-flip flop 18 is coupled to the input signal READY–. The Q output of flip flop 18 comprises a control signal BOFF–. The Q-output of flip flop 18 comprises a control signal BOFF+.

Control signal BOFF+ is coupled to an input of a NOR-Gate 22. The output of NOR-Gate 22 is an output of circuit 10 coupled to the backoff pin of a processor 24. The backoff pin connection is exemplary and is used for purposes of teaching the present invention. It should be understood that other processor inputs which cause the processor to relinquish the bus, such as AHOLD and HOLD on many processors, can be used without departing from the intended scope of the present invention. Processor 24 is coupled to a system bus (not shown) for address, data, and control signals. The READY– input signal is also coupled to the input of a clock switching logic 26. The Q output of D-flip flop 16, which is coupled to the D input of D-flip flop 18, comprises a control signal called SLOW–. SLOW– is also coupled to the clock switching logic 26. The output of clock switching logic 26 is a clock signal which is coupled to processor 24.

The control signal BOFF– and the clock signal output by clock switching logic 26 are coupled to the input of an OR-Gate 28. The output of OR-Gate 28 is coupled to the trigger input of a timer 30. Timer 30 outputs a control signal OUT+, which is input to another input of NOR-Gate 22. In the embodiment shown in FIG. 1, timer 30 may comprise an NE555 chip timer. As shown in FIG. 1, the THRES pin of timer 30 is coupled to VCC through a resistor 32, which may have a resistance of approximately 10 kiloohms. THRES is also coupled to the DISC pin of timer 30, and to ground through a capacitor 34, which may have a capacitance of 0.1 microfarads. The RESET and VCC pins of timer 30 are coupled to VCC, which may be 5 volts. The CONT pin of timer 30 is coupled to ground through a capacitor 36, which may have a capacitance of 0.01 microfarads.

In operation, circuit 10 operates to provide real time power conservation by stopping or slowing the clock input signal to processor 24. Stopping or reducing the clock speed to processor 24 results in power reduction since the power dissipated by processor 24 may be generally expressly by the following formula:

$$P = K_2 + (K_3 \times clk),$$

where P is the power dissipated in the processor in watts, $K_2$ is a constant power dissipation of processor 24 in watts, $K_3$ is a constant and expresses the energy dissipated in processor 24 per clock cycle in watt-seconds per cycle, and clk is the rate of the clock signal input to processor 24.

Real time power conservation is needed to conserve power during brief periods of inactivity, for example, when the computer is waiting for the next key to be pressed on the keyboard. In terms of clock speeds of modern computers, significant periods of inactivity exist even though, to the human eye, keys are being pressed in rapid succession.

Because significant power is consumed by microprocessors operating with relatively high speed clocks, battery life can be meaningfully extended by stopping or slowing the clock signal to a microprocessor. However, many processors have internal frequency multipliers, in which an externally supplied clock signal rate is multiplied within the processor for specific internal timing requirements. For purposes of power conservation, clock signal stoppage or reduction with these kinds of processors is not easily accomplished without causing a processor reset. Circuit 10, however, is able to provide real time power conservation for such processors.

To provide real time power conservation that is transparent to the user, circuit 10 stops or slows the clock rate to processor 24 during certain periods of inactivity. As shown by the above formula, this reduces the power dissipation within processor 24, thus significantly increasing battery life for such systems as battery powered portable computers. Circuit 10 does not cause a reset of processor 24, and thus during certain conditions, such as interrupts, processor 24 is immediately available for operation, continuing with the next operation following the last performed, or immediately returning to full speed if the clock has been slowed down. Circuit 10 allows for clock slowdown both to conserve power and to allow for device compatibility. For "device compatibility", the processor clock rate is slowed to allow the processor to operate with peripherals or software that require that the processor operate at clock rates (usually slower rates than that of the processor's maximum rate) within particular ranges. Circuit 10 is able to change the processor clock rate real time, for example during execution of a program on processor 24. Thus, the change in the clock rate is transparent to the user.

Circuit 10 operates to stop or slow the clock to processor 24 by removing (or slowing) the clock just after the current bus cycle is completed. Upon completion of the bus cycle, circuit 10 causes processor 24 to float the bus. Processors "float" the bus by entering into a state in which they no longer have control of the system bus. By floating the bus, other devices can use the bus while the processor clock is slowed or stopped. Processor 24 resumes control of the bus upon certain interrupts or resets or upon locking onto a slowed clock rate. To resume control, circuit 10 reapplies the clock to processor 24, and, after allowing the processor to lock onto the clock, causes the processor 24 to take control of the bus.

The specifics of the operation of circuit 10 are as follows. Control signals DATA7, CS–, and IOWR– provide an input/output ("I/O") port. IOWR– is the I/O write control signal, CS– is the chip select for the I/O port, and DATA7 is a data bit which sets the port. These control signals are used to stop or slow the clock to processor 24. For purposes of this discussion, it will be assumed that clock switching logic 26 stops the clock to processor 24. It should be understood, however, that circuit 10 also operates to provide device compatibility by reducing the clock speed to processor 24 rather than stopping the clock speed all together.

To stop the clock to processor 24, DATA7 is held low. When the output of OR-Gate 20 goes high because either CS– or IOWR– is held high, the SLOW– output of D-flip flop 16 goes low. The control inputs DATA7, CS–, and IOWR– may be generated by a monitor that is monitoring the activity of processor 24. As another example, these signals may be generated by hardware designed to stop the clock to processor 24 during preset intervals. It should be understood that control signals DATA7, CS–, and IOWR– may be generated from various sources without departing from the intended scope of the present invention, and that the clock rate may be changed in response to other types of control signals, for example, those generated by dedicated timers or activity monitors. A particular process that can be used to generate these signals is disclosed in related U.S. patent application Ser. No. 07/429,270 filed Oct. 30, 1989, now U.S. Pat. No. 5,218,704 entitled Real-Time Power Conservation for Portable Computers, and assigned to Texas Instruments Incorporated, and which is incorporated herein by reference.

The READY– control signal is generated by the system in which the present invention is to be used, and indicates that the current bus cycle associated with processor 24 has been completed (by going to a low state). READY– is a clock signal input to flip flop 18. Flip flop 18 may be characterized as bus cycle detect circuitry, although it should be understood that other circuits may be used to perform the same function without departing from the intended scope of the present invention. At completion of the current bus cycle, the SLOW– signal input to the D input of flip flop 18 is output as the BOFF– control signal. Similarly, the Q-output of D-flip flop 18, the BOFF+ control signal goes high, causing the output of NOR-Gate 22 to go low. Since the output of NOR-Gate 22 is coupled to the backoff pin of processor 24, processor 24 floats its bus at completion of the current bus cycle. Processor 24 floats the bus by releasing control of the bus. This is performed by entering into a high-z or low-z state in which processor 24 is effectively neither driving nor receiving signals from the bus.

The READY– signal indicating completion of the bus cycle, in combination with the SLOW– signal being low, will cause clock switching logic 26 to stop the clock signal to processor 24, just prior to processor 24 floating the bus. It should be understood that processor 24 can be made to float the bus before the clock signal is changed without departing from the intended scope of the present invention. During this power conservation mode, processor 24 is said to be asleep. It should be understood that clock switching logic 26 may comprise an ASIC for outputting the CLK signal based on a system clock, SLOW–, and READY–. Clock switching logic 26 includes circuitry known in the art for switching or slowing a clock signal without glitches or discontinuities.

It should be understood that in systems where the request to change the clock speed occurs where there is no bus cycle to be completed, such as during a HALT cycle or while a processor operators from an internal cache, circuitry for detecting the completion of a bus cycle is not needed. Furthermore, in such cases, the clock switching logic 26 would change the clock speed based only on the request to change the clock speed. Likewise, the processor 24 would float the bus solely in response to the request to change the clock speed.

Processor 24 can be awakened (the clock signal restored to processor 24) by operation of an interrupt or reset signal. It should be understood that other means, such as dedicated timers or activity monitoring systems, can be used to restore the clock rate without departing from the intended scope of the present invention. When the INTR signal goes active, indicating a system interrupt, such as an interrupt requesting an update of the system's time of day clock, NOR-Gate 12 presets D-flip flop 16, causing the SLOW– signal to go high. This results in the clock switching logic restoring the CPU clock to its maximum rate. The same operation results when the RESET signal is set active. As an example, RESET may be activated by a system reset. The RESET signal is also coupled to the input of NOR-Gate 14, resulting in a preset of D-flip flop 18 upon RESET going active. NOR-gates 12 and 14, and flip flops 16 and 18 may be characterized as resume circuitry, since they detect requests to restore the clock rate. It should be recognized that other circuitry may be used without departing from the intended scope of the present invention. Furthermore, as shown in FIG. 1, NOR-gate 12, OR-gate 20, and flip flop 16 may be characterized as detection circuitry, although other circuits can be used to detect requests to change the processor clock rate without departing from the intended scope of the present invention.

The clock signal, in addition to being sent to processor 24, is also used in conjunction with OR-Gate 28 and timer 30 to allow processor 24 to lock on to the clock signal before the backoff signal is released, thereby allowing processor 24 to regain control of the bus. Timer 30 and OR-gate 28 may be characterized as delay circuitry, although it should be understood that other delay circuits may be used without departing from the intended scope of this invention. When CLK goes low, the TRIGGER signal will cause the timer 30 to begin timing. At a predetermined length of time, for example one millisecond in the embodiment shown in FIG. 1, timer 30 will output the OUT+ signal. As shown in FIG. 1, this predetermined time is based on resistor 32 and capacitor 34. It should be recognized that the timer 30 can be adjusted to any desired time limit by adjusting resistor 32 and capacitor 34 without departing from the intended scope of this invention. Furthermore, other timing systems can be used without departing from the teachings herein.

The OUT+ signal goes high on the TRIGGER signal. OUT+ goes low after the preset time has expired. The OUT+ signal causes a preset of D-flip flop 18 through NOR-Gate 14 after TRIGGER goes active. By presetting D-flip flop 18, the BOFF+ signal goes low, thereby causing the backoff signal to be released when OUT+ goes low after the predetermined time has expired.

It should be understood that the description of circuit 10 has been for the particular embodiment illustrated. It should be recognized that for purposes of this discussion, signals have been described as being in specific low and high states. Other circuits of similar function, yet operating in different states, can be used without departing from the intended scope of the present invention. Furthermore, different logic elements than those shown in FIG. 1 may be used without departing from the intended scope of the present invention.

The circuit illustrated in FIG. 1 has been implemented with an Intel 80486DX2 processor on a Texas Instruments TM4000 notebook computer. With this circuit, it was found that the processor was not hot to the touch after running overnight at the disk operating system prompt.

As described above, the clock switching logic 26 may also be used to change the processor clock rate to a rate other than zero. This is performed by causing the processor to float the bus through the use of the backoff signal and changing the clock speed, which will result in the generation of the OUT+ signal to clear BOFF+ and then release of the backoff pin, causing the processor to resume control of the bus after the processor has locked onto the new clock rate. The maximum clock rate may be restored by increasing the clock rate, causing the processor to float the bus, allowing the processor to lock onto the new rate, and then having the processor resume activity on the bus, as described above.

FIG. 1 illustrates a particular embodiment of a circuit constructed according to the present invention. As shown in FIG. 1, discreet logic elements may be used to implement the disclosed invention. It should be understood that other devices, such as application specific integrated circuits ("ASICs") or programmable logic arrays ("PALs"), may be used to implement the present invention. To reduce device numbers in applications such as portable computers, it may be preferable to implement the discreet logic shown in FIG. 1 in an ASIC or PAL. Implementing the logic shown in FIG. 1 on such devices may be easily accomplished, as is known in the art. FIGS. 2–21 are diagrammatic representations of method of practicing the invention.

Although the present invention has been described in detail, it should be understood that the various changes, substitutions and alterations can be made without departing from the spirit and scope of the invention as defined solely by the appended claims.

What is claimed is:

1. A method for changing a clock rate supplied to a processor that internally multiplies said clock rate, comprising the steps of:
   detecting a request to change the processor clock rate;
   changing a first processor clock rate in response to the request to change the processor clock rate; and
   instructing the processor to suspend activity on a system bus in response to the request to change the processor clock rate.

2. The method of claim 1, and further comprising the steps of:
   waiting a selected length of time for the processor to lock onto a second processor clock rate; and
   instructing the processor to resume activity on the bus.

3. The method of claim 2, and further comprising the steps of:
   detecting a request to restore the pre-change processor clock rate;
   restoring the pre-change processor clock rate in response to the request to restore the pre-change processor clock rate;
   instructing the processor to suspend activity on the bus in response to detecting the request to restore the pre-change processor clock rate;
   waiting a selected length of time for the processor to lock onto the pre-change processor clock rate; and
   instructing the processor to resume activity on the bus after locking onto the pre-change processor clock rate.

4. The method of claim 3, and further comprising the step of monitoring the processor's activity to generate the request to restore the pre-change clock rate.

5. The method of claim 2, and further comprising the step of monitoring the processor's activity to generate the request to change the clock rate.

6. The method of claim 1, wherein said step of changing the processor clock rate comprises reducing the processor clock rate to zero.

7. The method of claim 1, and further comprising the step of monitoring the processor's activity to generate the request to change the processor clock rate.

8. The method of claim 1, wherein said step of changing the processor clock rate is performed while the processor is executing a program.

9. A method for changing a clock rate supplied to a processor that internally multiplies said clock rate, comprising the steps of:
   detecting a request to change the processor clock rate;
   changing the processor clock rate in response to the request to change the processor clock rate;
   instructing the processor to suspend activity on a system bus in response to the request to change the processor clock rate;
   detecting a request to restore the pre-change processor clock rate;
   restoring the pre-change processor clock rate in response to the request to restore the processor clock rate; and
   instructing the processor to resume activity on the bus after waiting a selected length of time for the processor to lock onto the pre-change processor clock rate.

10. The method of claim 9, and further comprising the step of monitoring the processor's activity to generate the request to restore the pre-change clock rate.

11. A method for changing a clock rate supplied to a processor that internally multiplies said clock rate, comprising the steps of:
    detecting a request to change the processor clock rate;
    detecting completion of a bus cycle;
    changing the processor clock rate in response to the request to change the processor clock rate; and
    instructing the processor to suspend activity on a system bus in response to detecting completion of the bus cycle.

12. The method of claim 11, and further comprising the steps of:
    detecting a request to restore the pre-change processor clock rate;
    restoring the pre-change processor clock rate in response to the request to restore the processor clock rate; and
    instructing the processor to resume activity on the bus after waiting a selected length of time for the processor to lock onto the pre-change processor clock rate.

13. The method of claim 12, and further comprising the step of monitoring the processor's activity to generate the request to restore the pre-change clock rate.

14. The method of claim 1, and further comprising the steps of:
    waiting a selected length of time for the processor to lock onto a second processor clock rate; and
    instructing the processor to resume activity on the bus.

15. The method of claim 14, and further comprising the steps of:
    detecting a request to restore the pre-change processor clock rate;
    detecting completion of a second bus cycle;
    restoring the pre-change processor clock rate in response to the request to restore the pre-change processor clock rate;
    instructing the processor to suspend activity on the bus in response to detecting completion of the second bus cycle;
    waiting a selected length of time for the processor to lock onto the pre-change processor clock rate; and
    instructing the processor to resume activity on the bus.

16. The method of claim 15, and further comprising the step of monitoring the processor's activity to generate the request to restore the pre-change processor clock rate.

17. The method of claim 14, and further comprising the step of monitoring the processor's activity to generate the request to change the clock rate.

18. The method of claim 11, wherein said step of changing the processor clock rate comprises reducing the processor clock rate to zero.

19. The method of claim 11, and further comprising the step of monitoring the processor's activity to generate the request to change the processor clock rate.

20. The method of claim 11, wherein said step of changing the processor clock rate is performed while the processor is executing a program.

21. A circuit for changing a clock rate supplied to a processor that internally multiplies said clock rate, comprising:
    detection circuitry operable to detect a request to change said processor clock rate;
    clock switching circuitry coupled to said detection circuitry and operable to change said processor clock rate in response to said request to change said processor clock rate; and suspend activity circuitry coupled to said detection circuitry and operable to cause said processor to suspend activity on a system bus in response to said request to change said processor clock rate.

22. The circuit of claim 21, wherein said clock switching circuitry is operable to reduce said processor clock rate to zero.

23. The circuit of claim 21, and further comprising circuitry for monitoring the processor's activity and operable to generate said request to change said processor clock rate.

24. The circuit of claim 21, wherein said processor clock rate is change while said processor is executing a program.

25. A circuit for changing a clock rate supplied to a processor that internally multiplies said clock rate, comprising:

detection circuitry operable to detect a request to change said processor clock rate;

clock switching circuitry coupled to said detection circuitry and operable to change said processor clock rate in response to said request to change said processor clock rate;

suspend activity circuitry coupled to said detection circuitry and operable to cause said processor to suspend activity on a system bus in response to said request to change said processor clock rate;

resume circuitry operable to detect a request to restore said pre-change processor clock rate;

said clock switching circuitry coupled to said resume circuitry and operable to restore said pre-change processor clock rate in response to said request to restore said pre-change processor clock rate; and delay circuitry coupled to said clock switching circuitry and said suspend activity circuitry, said delay circuitry operable to cause said processor to resume activity on said bus after waiting a selected length of time for said processor to lock onto said restored pre-change processor clock rate.

26. The circuit of claim 25, and further comprising circuitry for monitoring the processor's activity and operable to generate said request to restore said pre-change processor clock rate.

27. A circuit for changing a clock rate supplied to a processor that internally multiplies said clock rate, comprising:

detection circuitry operable to detect a request to change said processor clock rate;

clock switching circuitry coupled to said detection circuitry and operable to change said processor clock rate in response to said request to change said processor clock rate;

suspend activity circuitry coupled to said detection circuitry and operable to cause said processor to suspend activity on a system bus in response to said request to change said processor clock rate; and delay circuitry coupled to said clock switching circuitry and said suspend activity circuitry, said suspend activity circuitry operable to cause said processor to resume activity on said bus after waiting a selected length of time for said processor to lock onto said changed processor clock rate.

28. The circuit of claim 27, and further comprising resume circuitry operable to detect a request to restore said processor clock rate, and wherein:

said clock switching circuitry is further coupled to said resume circuitry and operable to restore said pre-change processor clock rate in response to said request to restore said pre-change processor clock rate;

said suspend activity circuitry is further operable to cause said processor to suspend activity on said bus in response to said request to restore said processor clock rate; and said delay circuitry is further operable to cause said processor to resume activity on said bus after waiting a selected length of time for said processor to lock onto said restored pre-change processor clock rate.

29. The circuit of claim 26, and further comprising circuitry for monitoring the processor's activity and operable to generate said request to restore said pre-change processor clock rate.

30. The circuit of claim 27, and further comprising circuitry for monitoring said processor's activity and operable to generate said request to change said clock rate.

31. The circuit of claim 27, wherein said processor utilizes internal frequency multipliers for internal timing.

32. The circuit of claim 27, wherein the processor clock rate is changed without causing a system reset or reboot.

33. The circuit of claim 27, wherein the processor clock rate is changed to conserve power.

34. The circuit of claim 27, wherein the processor clock rate is changed to allow the processor to operate with peripherals or software that require the processor to operate at clock rates within particular ranges.

35. The circuit of claim 27, wherein the processor releases control of the bus when it suspends activity on the bus.

36. The circuit of claim 35, wherein control of the bus is released by the processor floats the bus by entering into one of a high-z and a low-z state in which the processor is effectively neither driving nor receiving signals from the bus.

37. A circuit for changing a clock rate supplied to a processor that internally multiplies said clock rate, comprising:

detection circuitry operable to detect a request to change said processor clock rate;

bus cycle detect circuitry operable to detect completion of a bus cycle;

clock switching circuitry coupled to said detection circuitry and operable to change said processor clock rate in response to said request to change said processor clock rate; and suspend activity circuitry coupled to said bus cycle detect circuitry and operable to cause said processor to suspend activity on a system bus in response to detecting completion of said bus cycle.

38. The circuit of claim 37, and further comprising:

resume circuitry operable to detect a request to restore said pre-change processor clock rate;

said clock switching circuitry coupled to said resume circuitry and operable to restore said pre-change processor clock rate in response to said request to restore said pre-change processor clock rate; and delay circuitry coupled to said clock switching circuitry and said suspend activity circuitry, said delay circuitry operable to cause said processor to resume activity on said bus after waiting a selected length of time for said processor to lock onto said restored pre-change processor clock rate.

39. The circuit of claim 38, and further comprising circuitry for monitoring the processor's activity and operable to generate said request to restore said pre-change processor clock rate.

40. The circuit of claim 37, wherein said clock switching circuitry is operable to reduce said processor clock rate to zero.

41. The circuit of claim 37, and further comprising circuitry for monitoring the processor's activity and operable to generate said request to change said processor clock rate.

42. The circuit of claim 37, and further comprising delay circuitry coupled to said clock switching circuitry and said suspend activity circuitry, said delay circuitry operable to cause said processor to resume activity on said bus after waiting a selected length of time for said processor to lock onto said changed processor clock rate.

43. The circuit of claim 42, and further comprising resume circuitry operable to detect a request to restore said pre-change processor clock rate, and wherein:

said bus cycle detect circuitry is further operable to detect completion of a second bus cycle;

said clock switching circuitry is further coupled to said resume circuitry and operable to restore said pre-change processor clock rate in response to said request to restore said pre-change processor clock rate;

said suspend activity circuitry is further operable to cause said processor to suspend activity on said bus in response to detecting completion of said second bus cycle; and said delay circuitry is further operable to cause said processor to resume activity on said bus after said processor locks onto said restored pre-change processor clock rate.

44. The circuit of claim 43, and further comprising circuitry for monitoring the processor's activity and operable to generate said request to restore said pre-change processor clock rate.

45. The circuit of claim 42, and further comprising circuitry for monitoring said processor's activity and operable to generate said request to change said clock rate.

46. The circuit of claim 27, wherein said processor clock rate is changed while said processor is executing a program.

47. A device for changing a clock rate supplied to a processor that internally multiplies said clock rate, comprising:

detection circuitry operable to detect a request to reduce a clock rate to said processor;

bus cycle detect circuitry operable to detect completion of a bus cycle;

suspend activity circuitry coupled to said detection circuitry and said processor, said suspend activity circuitry operable to cause said processor to relinquish control of a system bus;

clock switching circuitry coupled to said detection circuitry and operable to reduce said processor clock rate prior to said processor relinquishing control of said bus;

resume circuitry coupled to said detection circuitry and operable to detect a request to increase said clock rate and further operable to cause said clock switching circuitry to restore said pre-change clock rate; and delay circuitry coupled to said clock switching circuitry and said suspend activity circuitry, said delay circuitry operable to cause said processor to resume activity on said bus after waiting a selected length of time to allow said processor to lock onto said restored pre-change clock rate.

48. An apparatus, comprising:

a processor that internally multiplies an externally supplied processor clock rate;

detection circuitry operable to detect a request to change said processor clock rate;

clock switching circuitry coupled to said detection circuitry and operable to change said processor clock rate in response to said request to change said processor clock rate;

suspend activity circuitry coupled to said detection circuitry and operable to cause said processor to suspend activity on a system bus in response to said request to change said processor clock rate;

resume circuitry operable to detect a request to restore said pre-change processor clock rate;

said clock switching circuitry coupled to said resume circuitry and operable to restore said pre-change processor clock rate in response to said request to restore said pre-change processor clock rate; and delay circuitry coupled to said clock switching circuitry and said suspend activity circuitry, said delay circuitry operable to cause said processor to resume activity on said bus after waiting a selected length of time for said processor to lock onto said restored pre-change processor clock rate.

49. An apparatus, comprising:

a processor that internally multiplies an externally supplied processor clock rate;

detection circuitry operable to detect a request to change said processor clock rate;

clock switching circuitry coupled to said detection circuitry and operable to change said processor clock rate in response to said request to change said processor clock rate;

suspend activity circuitry coupled to said detection circuitry and operable to cause said processor to suspend activity on a system bus in response to said request to change said processor clock rate; and delay circuitry coupled to said clock switching circuitry and said suspend activity circuitry, said suspend activity circuitry operable to cause said processor to resume activity on said bus after waiting a selected length of time for said processor to lock onto said changed processor clock rate.

50. An apparatus, comprising:

a processor that internally multiplies an externally supplied processor clock rate;

detection circuitry operable to detect a request to change said processor clock rate;

bus cycle detect circuitry operable to detect completion of a bus cycle;

clock switching circuitry coupled to said detection circuitry and operable to change said processor clock rate in response to said request to change said processor clock rate; and suspend activity circuitry coupled to said bus cycle detect circuitry and operable to cause said processor to suspend activity on a system bus in response to detecting completion of said bus cycle.

\* \* \* \* \*

UNITED STATES PATENT AND TRADEMARK OFFICE
CERTIFICATE OF CORRECTION

PATENT NO. : 5,784,598
DATED : July 21, 1998
INVENTOR(S) : Jenni L. Griffith

It is certified that error appears in the above-identified patent and that said Letters Patent is hereby corrected as shown below:

Title page, after item [73]
Delete the following:

Notice: This patent issued on a continued prosecution application filed under 37 CFR 1.53(d), and is subject to the twenty year patent term provisions of 35 U.S.C. 154(a)(2).

Replace the above with the following:

Notice: This patent issued on a continued prosecution application filed under 37 CFR 1.53(d), and, pursuant to the provisions of 35 U.S.C. 154(c)(1), the term of the subject patent shall be the greater of the 20-year term as provided in 35 U.S.C. 154(a), or 17 years from grant, subject to any terminal disclaimers.

Signed and Sealed this

Fourteenth Day of August, 2001

*Attest:*

NICHOLAS P. GODICI
*Attesting Officer*    *Acting Director of the United States Patent and Trademark Office*